United States Patent [19]
Easterly

[11] 3,888,573
[45] June 10, 1975

[54] CONTROL MECHANISM FOR A WEB TRANSPORTING DEVICE

[75] Inventor: Donald O. Easterly, Rochester, N.Y.

[73] Assignee: Eastman Kodak Company, Rochester, N.Y.

[22] Filed: July 25, 1973

[21] Appl. No.: 382,621

[52] U.S. Cl. ............ 352/166; 242/204; 352/124; 352/157; 352/173
[51] Int. Cl. .............................................. G03b 1/00
[58] Field of Search .......... 352/124, 157, 158, 159, 352/173, 174, 176, 178; 226/49, 50, 51; 242/201, 204, 205

[56] References Cited
UNITED STATES PATENTS

| 1,944,035 | 1/1934 | Proctor | 352/124 |
|---|---|---|---|
| 2,946,585 | 7/1960 | Rosenberg | 242/201 X |
| 3,159,841 | 12/1964 | Castedello | 352/124 X |
| 3,240,550 | 3/1966 | Mitchell | 352/124 |
| 3,439,981 | 4/1969 | Nemeth | 352/173 X |
| 3,734,602 | 5/1973 | Deck | 352/124 X |

*Primary Examiner*—Monroe H. Hayes
*Attorney, Agent, or Firm*—J. A. Morrow

[57] ABSTRACT

A control mechanism for use with a web transporting device, such as a motion picture projector or other related apparatus, includes a single member which is effective to selectively position brake members and drive members of the transporting device into and out of operative positions such that the device can be readily shifted between various modes of operation without resulting breakage or spillage of the web member.

12 Claims, 4 Drawing Figures

PATENTED JUN 10 1975

3,888,573

SHEET 1

3,888,573

CONTROL MECHANISM FOR A WEB TRANSPORTING DEVICE

CROSS REFERENCE TO RELATED APPLICATIONS

Reference is hereby made to commonly assigned U.S. Pat. Application Ser. No. 294,709 entitled REEL DRIVING DEVICE FOR A WEB TRANSPORTING APPARATUS, filed Oct. 3, 1972, in the name of Donald O. Easterly; U.S. Patent Application Ser. No. 382,620, entitled, SPINDLE CONTROL MECHANISM; filed July 25, 1973, in the name of Donald E. Day; and U.S. Patent Application Ser. No. 382,636, entitled, PROJECTOR FUNCTION CONTROL MECHANISM, filed July 25, 1973, in the names of Donald O. Easterly and Donald E. Day.

BACKGROUND OF THE INVENTION

1. Field of the Invention

The present invention relates to a control mechanism for a web transporting device. More particularly, the invention is directed to a simple and reliable mechanism for controlling the operation of the transporting device without causing breakage or spillage of the web material.

2. Description of the Prior Art

Control mechanisms for permitting multiple modes of operation in web transporting mechanisms such as motion picture projectors, tape recorders, or other related apparatus are well known. For example, see U.S. Pat. Nos. 1,944,022; 2,877,958; 3,131,882; 3,448,940; and 3,664,609. Preferably, such control mechanisms should include braking members which apply a greater braking force to the supply spindle which is moving in an unwinding direction than the take-up spindle which is moving in a winding direction for if such a differential braking feature is not included, the web material could be spilled from the supply reel when the brakes are applied. While mechanisms for applying such a differential braking force are known in the prior art, such mechanisms may have relatively elaborate linkages or electrical control systems, and may require very accurate dimensional tolerances.

SUMMARY OF THE INVENTION

An object of the present invention is to provide a relatively simple mechanical control system for braking the spindles of a web transporting mechanism.

Another object of the invention is to provide such a control mechanism that is operable by means of a single manually movable selector member.

Still another object of the invention is to provide a self-energizing braking mechanism to provide differential braking forces without the necessity of maintaining critical dimensional tolerances.

A further object of the invention is to provide a simple mechanical braking mechanism that is positive in operation without providing excessive forces to a web material which is being driven by the transport mechanism.

Briefly these and other related objects are realized in accordance with the invention by means of a control mechanism which includes first and second rotatable spindles suitable for winding and unwinding a received filmstrip which is transported therebetween, first driving means and first braking means for controlling the driving and braking of the first spindle, second driving and braking means for controlling the driving and braking of the second spindle, and control means for moving the first and second braking means between a first condition wherein the first braking means brakes rotation of the first spindle sequentially before the braking of the rotation of the second spindle by the second braking means and a second condition wherein the second braking means brakes rotation of the second spindle sequentially before the braking of the rotation of the first spindle by the first braking means.

The invention and its objects and advantages will become apparent in the detailed description of the preferred embodiment presented below.

BRIEF DESCRIPTION OF THE DRAWINGS

In the detailed description of the preferred embodiment presented below, reference is made to the accompanying drawings, in which.

DESCRIPTION OF THE PREFERRED EMBODIMENT

Because motion picture projectors and related apparatus are well known, the following description is directed in particular to the element forming part of or cooperating directly with the present invention. Elements not specifically shown or described herein being understood to be selectable from those known in the art.

Figure 1:
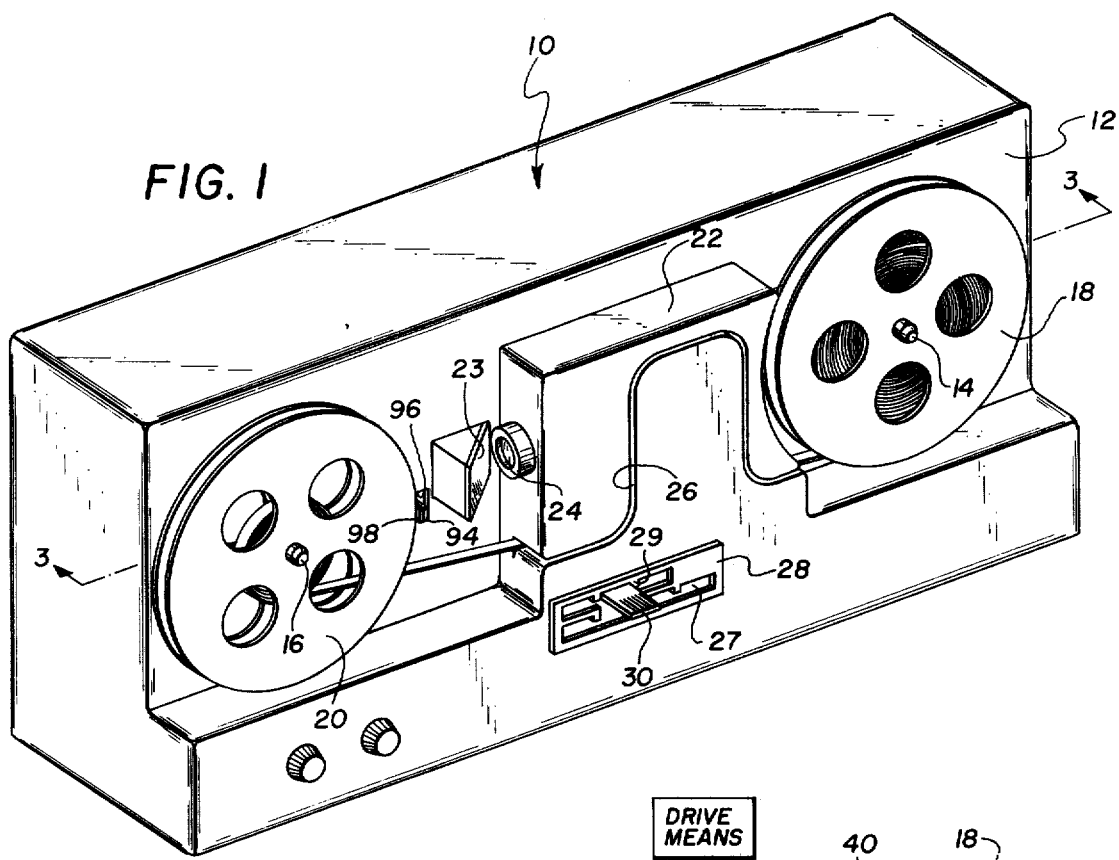
FIG. 1 is a perspective view of an illustrative motion picture projector incorporating a control mechanism according to the present invention.

Referring first to FIG. 1 of the accompanying drawings, the illustrative projector 10 comprises a box-like housing 12 for the various internal components hereinafter described. A pair of spaced film reel spindles 14 and 16 project from the housing to removably support the respective film supply and takeup reels 18 and 20 in a common plane at the opposite ends of one side of housing 12. Housing 12 includes a portion 22 that projects into the plane between the reels 18 and 20. A projection lens 24 projects from housing portion 22 and the optical axis of the lens is oriented to direct light from a lamp (not shown) onto a mirror 23. A slot in housing portion 22 defines a film path 26 which extends between the two reels, between the lamp and the projection lens 24 and through a film gate (not shown) therebetween, and past a film advancing mechanism (not shown) that is located along the film path within housing portion 22.

Figure 2:
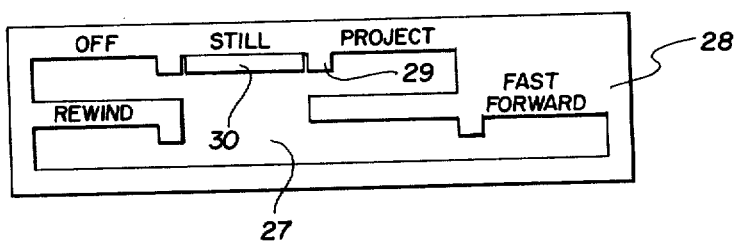
FIG. 2 is an enlarged elevation view of the selection plate and control lever of the projector as shown in FIG. 1 illustrating various operating positions.

The movement of the film along path 26 is controlled by the operator moving a mode selection lever 30 along a generally "H" shaped opening or slot 27 in the selection or face plate 28 to the off, still, project, rewind, or fast forward positions which are identified upon the enlarged view of the fact plate depicted in FIG. 2. Movement of the selection lever 30 to the various operating positions affects the control mechanism of the present invention as will be discussed later in greater detail, and also controls other projection linkage as described in detail in the before-mentioned commonly assigned copending U.S. Pat. Application Ser. No. 382,620 entitled, SPINDLE CONTROL MECHANISM, filed on even date herewith in the name of Donald E. Day, U.S. Pat. Application Ser. NO. 382,636, entitled, Projector Function Control Mechanism, filed on even date herewith in the name of Donald O. Easterly et al. As best shown in FIG. 2, there are a plurality of downward extending protrusions such as shown at 29 along the opening 27 that separate the various operating position of lever 30 and are effective to positively maintain the selection lever 30 in the off, still, project, rewind or fast forward positions once the operator has depressed the selection lever 30 against the upward urging of the spring 70 and has positioned the selection lever laterally to one of the plurality of positions to obtain the desired mode of operation of the projector.

Figure 3:
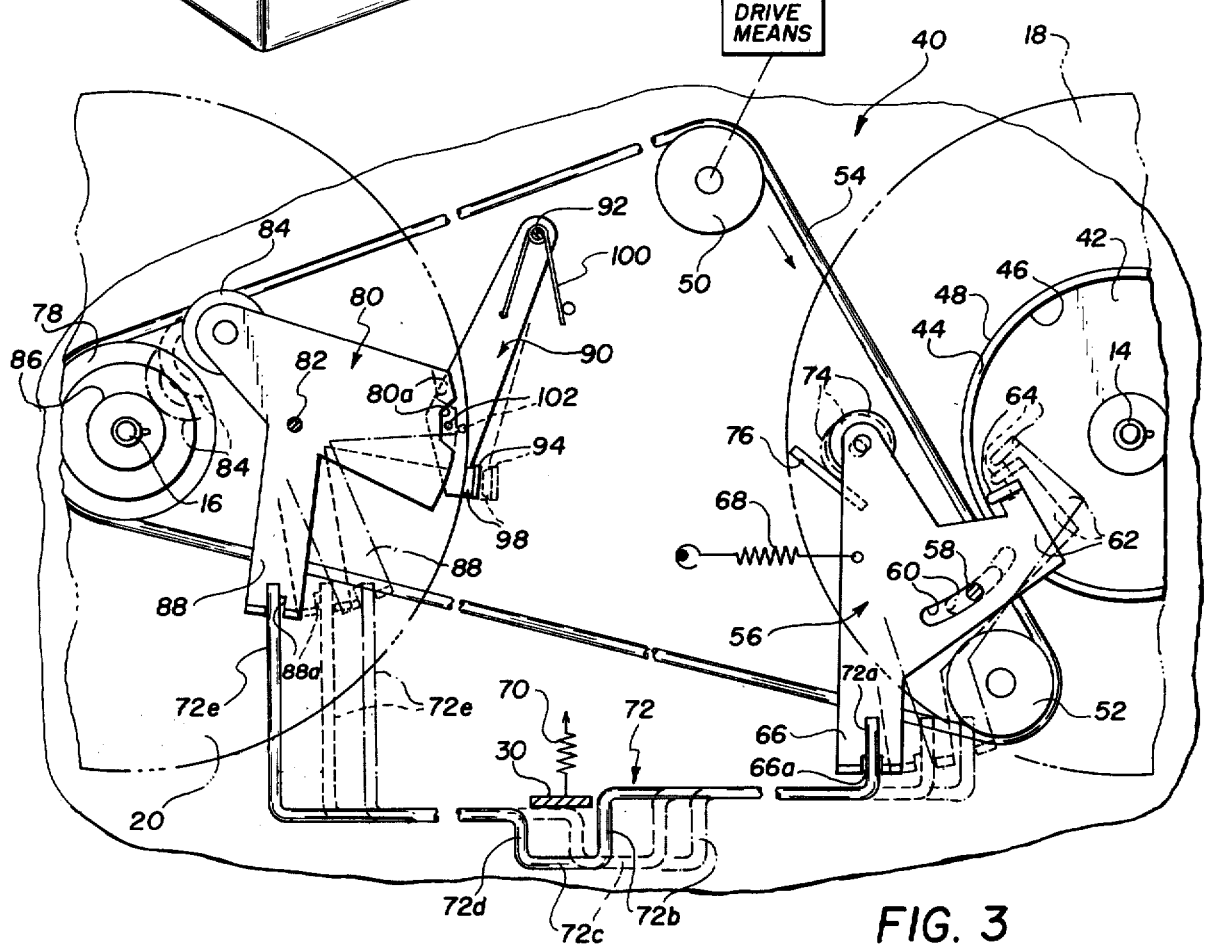
FIG. 3 is a somewhat schematic view taken along line 3—3 of FIG. 1 showing the driving and braking elements of the projector being shifted by the control mechanism between the "still" position shown in solid on the left, the "project" position shown in phantom in dashed lines in the middle, and the "fast forward" position shown in phantom in dashed and dotted lines on the right.
Figure 4:
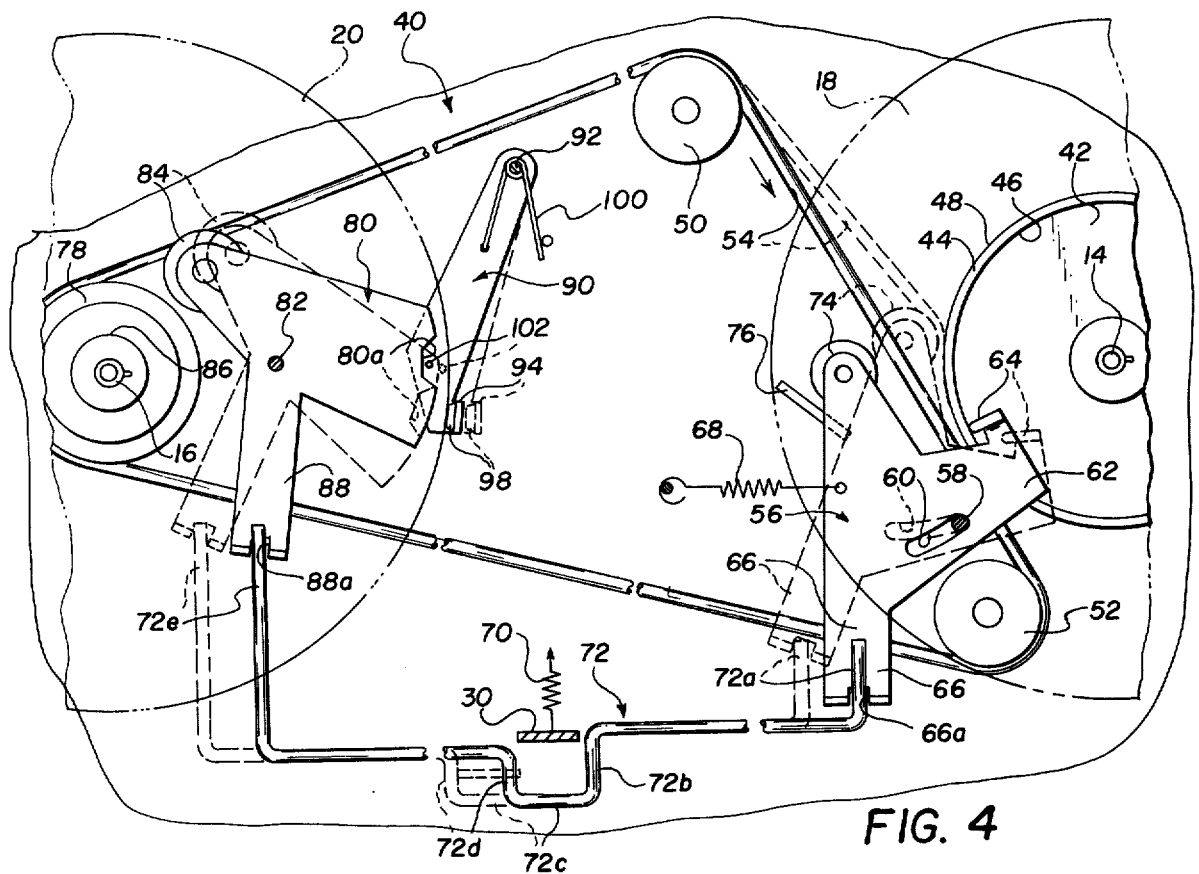
FIG. 4 is a view similar to FIG. 3 showing the driving and brakiing elements of the projector moved between the still position shown in solid on the right and the "rewind" position shown in phantom in dashed lines on the left.

Referring now in detail to FIGS. 3 and 4, the film reel spindles 14 and 16 are rotatably supported by a frame plate 40 which is carried by the projector casing 12. Secured to spindle 14 is a drum 42 having a peripheral lip 44 that defines a cylindrical internal braking surface 46 and a cylindrical external driving surface 48. Spindle 16 is preferably a weight-sensitive type such as disclosed in the commonly assigned copending U.S. Patent Application Ser. No. 294,709, entitled, REEL DRIVING DEVICE FOR A WEB TRANSPORTING APPARATUS, filed Oct 3, 1972 in the name of Donald O. Easterly. Secured to spindle 16 is a pulley 78 which, along with an idler pulley 52 and a drive pulley 50, carry a continuous elastic belt 54. Drive pulley 50 is driven by conventional drive means (shown schematically in FIG. 3) such that the belt 54 is driven in a clockwise direction as viewed in the drawings.

A supply reel control plate 56 is pivotally mounted to the frame plate 40 by a pivot stud 58 received in an arcuate slot 60 in the plate. Control plate 56 includes an extension 62 which supports a friction pad or brake pad 64 in position for contacting braking surface 46 to brake or retard the rotation of the drum 42. Also supported by the control plate 56 is a freely rotatable roller 74 which is located in a common plane with the belt 54 and is movable in that plane by the clockwise pivoting movement of the control plate 56 for urging the belt 54 into engagement with the driving surface 48 of drum 42 for rotatably driving the drum. Roller 74 also is energizable with a stop member 76 secured to the frame plate 40 to define a pivot for the movement of the control plate 56 when the control plate is pivoted in the counterclockwise direction. These functions of roller 74 will be explained in detail later.

As shown in FIGS. 3 and 4, selection lever 30 acts through a control rod 72 to alter the position of the control plate 56 and thereby change the operating mode of the supply spindle 14 as described in more detail in the aforementioned commonly assigned copending U.S. Patent Application Ser. No. 382,620. A first end portion 72a of a control rod 72 extends through an opening 66a in extension 66 of control plate 56 for moving the control plate through a range of positions as the rod 72 is moved by the selection lever 30. As may be seen in FIGS. 3 and 4, selection lever 30 cooperates with a generally "U-shaped" portion of a control rod 72 which is defined by vertical legs 72b, 72d and a horizontal connecting segment 72c. In the preferred embodiment, leg 72d is shorter than leg 72b such that selector lever 30 will pass over leg 72d and not cause movement of control rod 72 when the selector lever is moved upwardly and then laterally to the upper left hand position (i.e., to the off position) in opening 27 of the face plate 28. As will be explained later in greater detail, in the preferred embodiment the movement of the selection lever 30 from the still position to the off position is the only movement of the lever 30 which will not cause corresponding movement of control rod 72 and the associated projector mechanism.

A second end portion 72e of the control rod 72 extends through an opening 88a in an extension 88 of a control lever 80 which is pivotally mounted to the frame plate 40 by a pivot stud 82. The lateral movement of control rod 72 to the right to the fast forward position sown in the dotted and dashed lines in FIG. 3 causes relative pivotal movement of the control lever 80 for moving a pressure wheel 84, which is supported by the control lever 80, into radial alignment with a hub member 86 for causing spindle 16 to be driven more positively in a clockwise direction in a manner such as described in the beforementioned commonly assigned copending U.S. Patent Application Ser. No. 294,709 entitled, REEL DRIVING DEVICE FOR A WEB TRANSPORTING APPARATUS, filed Oct. 3, 1972, in the name of Donald O. Easterly, which is incorporated herein by reference. The radial force or load exerted on spindle 16 by the pressure wheel 84 is substantially greater than the force attributed to the weight of reel 20 and the film which may be wound thereon and it increases the friction between clutch elements of the spindle 16, thereby increasing the torque transmission to the spindle. Movement of the control rod 72 by the operator is also effective to control the operation of the take-up spindle 16 by causing braking of the spindle as will be described now.

A brake lever 90 is pivotally supported to the frame plate 40 by a pivot stud 92. Brake lever 90 includes a finger-like member 94 that extends through a slot 96 in the housing 12 adjacent the rim of the take-up reel 20 as illustrated in FIG. 1. A friction pad 98 is carried by finger 94 in edgewise alignment with the peripheral edge of the inner flange of reel 20. A hairpin spring 100 urges the brake lever in a clockwise direction around stud 92 to urge the friction pad toward the reel. A cam follower 102 on the brake lever 90 is aligned with a notch-like cam surface 80a of the take-up reel control lever 80. A portion of cam surface 80a is indented such that friction pad 98 engages reel 20, under the influence of spring 100, whenever cam follower 102 is received in the indented portion, and when the follower 102 is removed from the indented portion the friction pad is restrained from engaging the reel.

Because of the relative placements of stud 92, the pressure pad 98 and the take-up reel 20, the braking action between the pad 98 and the reel 20 tends to be self-energizing whenever the brake pad is brought into engagement with the reel as the reel is being driven in the counterclockwise or film rewinding direction. That is, as the friction pad 98 is urged into peripheral engagement with the reel 20 while it is being rotatably driven in the counterclockwise direction, the pad tends to be urged more firmly into contact with the edge of flange of the reel 20. The faster the reel is turning in the counterclockwise direction, the greater is the tendency of the reel to urge or pull the pad into contact with the flange itself and thereby create a greater braking force between the reel and the pad. When the reel 20 is driven in the clockwise direction during the project or fast forward mode of operation, the force of hairspring 100 is the only effective force which applies braking force to the reel 20 for the rotation of the reel 20 tends to urge the brake pad 98 away from the reel instead of urging the brake pad 98 into engagement with the reel. Thus, it is realized that the self-energizing feature which tends to increase the braking effectiveness is a function of both the direction rotation and the speed of rotation of the reel.

Referring now specifically to FIG. 3, control lever 30 is shown in solid lines as it would be positioned for the still mode of operation wherein control rod 72, plate 56 and lever 80 are positioned by the lever 30 such that brake pad 64 is fully in engagement with braking surface 46 and friction pad 98 is in engagement with reel 20. In the still position, both the supply reel 18 and the take-up reel 20 are thereby inhibited from rotating by this braking action and a single image frame of the film can then be projected.

If the operator shifts the selection lever 30 from the still position shown in solid in FIG. 3 to the project mode of operation, the movement of lever 30 moves control rod 72 to the right (to the middle position shown in phantom in dashed lines in FIG. 3). This movement of the control rod 72 rotates the control plate 56 in a counterclockwise direction about pivot stud 58 against the urging of spring member 68, wherein friction pad 64 is removed from contact with braking surface 44 of drum 42, thereby conditioning the spindle for a free-wheeling mode of operation and permitting the film to be freely removed from the supply reel 18. At the same time, this movement of control rod 72 also causes control lever 80 to be pivoted in a counterclockwise direction around pivot stud 82, thereby causing cam follower 102 to ride up a ramp on cam surface 80a and be removed from the indented portion of the cam surface. This removes friction pad 98 from contact with the peripheral surface of reel 20 so that reel 20 can be rotatably driven by the weight sensitive spindle 16. When the projector is in the project mode as described above, the pressure wheel 84 remains a spaced distance from hub member 86 (as indicated in phantom in dashed lines in FIG. 3) such that the reel 20 is driven through the force applied by the spindle which results from the weight of the reel and film alone.

To terminate the project mode of operation, the operator must depress lever 30 slightly so that it can be moved under the protrusion 29 of the frame plate 28 and then the operator can move the lever horizontally to the left toward the still position shown as a solid line in FIG. 3 wherein spring member 68 again returns control plate 56 in the clockwise direction about the pivot stud 58 to the braking position wherein brake pad 64 is initially moved into engagement with braking surface 46 as previously described. Continued movement of rod 72 results in control plate 56 pivoting about the brake pad 64 with the arcuate opening 60 being slid along the pivot stud 58 while spring 68 continues to maintain brake pad 64 in braking engagement with braking surface 46. Through the control rod 72, the control lever 80 is sequentially returned in the clockwise direction about pivot stud 82 to the position wherein the cam follower 102 passes into the indented portion of cam surface 80a allowing friction pad 97 to again contact reel 20. In the preferred embodiment of the projector shown, the shape and position of the cam surface 80a is such that this movement of the control rod 72 is effective first to initiate braking of the supply spindle 18 through brake pad 64 acting with braking surface 46 and then to subsequently initiate braking of the take-up reel 20 by the friction pad 98. This sequential braking feature results in a braking force being applied to the supply spindle first and then to the take-up reel so as to effectively eliminate "spilling" of the film from supply roll due to inertia of the roll.

If the operator were then to move the selection lever 30 downward from the still position, against the urging of the spring 70, lever 30 lever 30 then can be shifted horizontally along the lower opening in control plate 28 to either the fast forward or rewind positions. Moving the selectionlever 30 to the lower right-hand position (into the fast forward position shown in phantom in dot and dashed lines in FIG. 3) causes movement of control plate 56 and control lever 80 further in the counterclockwise direction than previously described for the project mode of operation and thereby additionally causes pressure wheel 84 to apply a radial force to the hub member 86 of the weight sensitive take-up spindle for causing a faster rotation by the spindle 16. As previously described in more detail in the before-mentioned commonly-assigned copending U.S. Patent Application Ser. No. 294,709 entitled REEL DRIVING DEVICE FOR A WEB TRANSPORTING APPARATUS, filed Oct. 3, 1972 in the name of Donald O. Easterly, the radial force applied to the hub member 86 effects a more positive drive of the spindle 16 than provided by the weight of the reel and the film upon the spindle 16. The continued rotation of control plate 56 causes rotatable drive roller 74 to be urged into a contact with a stop member 76 which is secured to the frame plate 40 such that control plate 56 then pivots about stop member 76 until the left end of the arcuate slot 60 is positioned near the pivot stud 58. This is the position shown in phantom at the upper right in FIG. 3. If the operator then moves the selection lever 80 from the fast forward position to the left and once again into the still position, spring 68 urges control plate 56 in a counterclockwise direction such that brake pad 64 engages braking surface 46 for braking reel 18 and the control rod 72 urges control lever 80 to also return counterclockwise direction toward the still position causing braking of reel 20, such braking occurring sequentially as previously described. When in the still position as shown in solid in FIGS. 3 and 4, the pivot stud is at or near the right end of the arcuate opening 60.

Referring now specifically to FIG. 4, if the operator has depressed the selection lever 30 and moved the lever horizontally to the left from the still position (shown in solid lines) to the rewind position (shown in phantom in dashed lines) control lever 80 and control plate 56 are rotated in a clockwise direction by the control rod 72. The rotation of control lever 80 in this direction restrains pressure wheel 84 from contacting the hub member 86 and causes cam follower 102 to be removed from the indented portion of cam surface 80a resulting in friction pad 94 being removed from contact with the reel 20. The rotation of control plate 56 about the pivot stud 58 releases the brake pad 64 from the braking surface 46 to permit reel 18 to be driven and causes the idler roller 74, which is supported by control plate 56, to urge belt 54 into resilient driving contact with the drive surface 48 on spindle 14 for driving the spindle in a counterclockwise direction as is described in the before-mentioned commonly-assigned corresponding U.S. Pat. Application Ser. No. 382,620, entitled Spindle Control Mechanism, filed July 25, 1973, in the name of Day When the operator depresses the shift lever 30 below the protrusion and returns the lever to the right to remove the projector from the rewind mode of operation, control rod 72 urges both control lever 80 and control plate 56 in a counterclockwise direction. The movement of control lever 80 in this direction causes cam follower 102 to return to the indented portion of cam surface 80a resulting in friction pad 94 returning into contact with reel 20 and removing idler roller 74 from contact with belt 54. In the preferred embodiment of the present invention, the indentation in cam 80a is positioned such that movement of the control rod 72 to the right toward the still position (shown in solid lines) results in the braking of reel 20 by the friction pad 98 slightly in advance to the engagement of braking surface 46 with the brake pad 64. Also, as previously described, the self-energizing feature of the firction pad 94 results in increasing braking force being applied to the reel 20 so as to prevent the spilling friction the film from the take-up reel 20 as the projector is removed from the rewind mode of operation.

The invention has been described in detail with particular reference to a preferred embodiment thereof, but it will be understood that variations and modifications can be effected within the spirit and scope of the invention.

I claim:

1. A control mechanism for a motion picture projector, said control mechanism comprising:
   a. first and second spindles rotatably supported by said motion picture projector;
   b. first drive means adapted to cooperate with and to rotatably drive said first spindle;
   c. second drive means adapted to cooperate with and to rotatably drive said second spindle, said second drive means including (1) clutch means including
      i. a rotatably-powered driving member; and
      ii. a driven member frictionally coupled to said driving member such that said driven member is adapted to transmit an increased driving torque to said second spindle as a function of an increased force applied to said driver member; and
      iii. force applying means movable between a first condition wherein said force applying means is effective to apply an increased force to said driven member and a second condition wherein said force applying means is restrained from applying an increased force;
   d. first and second brake means adapted to cooperate with and to brake rotation of said first and second spindles, respectively; and
   e. control means adapted to control said first and second drive means, said first and second brake means, and said force applying means of said clutch means, said control means being positionable between (1) a still position wherein said first and second brake means cooperate with said first and second spindles respectively to restrain said spindles from rotation, (2) a project position wherein said second drive means rotatably drives said second spindle at a first rate, (3) a rewind position wherein said first drive means cooperates with said first spindle and rotatably drives said first spindle, and (4) a fast forward position wherein said second drive means rotatably drives said second spindle at a second and greater rate.

2. A mechanism for sequentially braking first and second spindles of a motion picture projector, said mechanism comprising:
   a. brake means adapted to cooperate with said first spindle to brake rotation of said first spindle;
   b. a control plate movably secured to said projector, said control plate supporting said brake means for movement between (1) a first position wherein said brake means is effective to brake rotation of said first spindle and (2) a second position wherein said brake means is restrained from braking rotation of said first spindle;
   c. a cam member movably mounted to said projector;
   d. a brake member movably mounted to said projector and operatively coupled to said cam member, said brake member being movable by said cam member between (1) a first position wherein it is effective to brake rotation of said second spindle and (2) a second position wherein it is restrained from braking rotation of said second spindle; and
   e. control means operatively coupling said control plate and said cam member for movement to (1) a first condition wherein said brake means is moved to its first position to initiate braking of said first spindle sequentially before said brake member is moved to its first position to brake rotation of said second spindle and to (2) a second condition wherein said cam member moves said brake member to its first position to initiate braking of said second spindle sequentially before said brake means is moved to its first position to brake rotation of said first spindle.

3. A motion picture projector having first and second spindles adapted to receive film reels for transporting a film strip therebetween, said projector comprising:
   a. brake means adapted to cooperate with said first spindle to brake rotation of said first spindle;
   b. a control plate movably secured to said projector, said control plate supporting said brake means for movement between (1) a first position wherein said brake means is effective to brake rotation of said first spindle and (2) a second position wherein said brake means is restrained from braking rotation of said first spindle;
   c. a cam member movably mounted to said projector;
   d. a brake member movably mounted to said projector at a point located along a radius extending from said second spindle, said brake member being operatively coupled to said cam member for movement between (1) a first position wherein said brake member is effective to contact said reel received by said second spindle at a point which is removed from said radius, said braking member being effective to apply a first braking force when said brake member contacts said reel as it is being driven in a first direction and being effective to apply a second and greater braking force when said brake member contacts said reel as it is being rotated in a second direction and (2) a second position wherein said brake member is restrained from braking rotation of said second spindle; and e. control means operatively coupling said control plate and said cam member for movement to (1) a first condition wherein said brake means is moved to its first position to initiate braking of said first spindle sequentially before said brake member is moved to its first position to apply said first braking force to brake rotation of said second spindle and (2) a second condition wherein said cam member moves said brake member to its first position to apply said second braking force to initiate braking of said second spindle sequentially before said brake means is moved to its first position to brake rotation of said first spindle.

4. A mechanism for selectively controlling the movement of a received web of material, the mechanism comprising:

a. a frame;

b. a first spindle rotatably supported by said frame, said first spindle being adapted to receive said web material;

c. drive means engageable with said first spindle for rotatably driving said first spindle;

d. brake means engageable with said first spindle for braking rotation of said first spindle;

e. support means movably secured to said frame, said support means for supporting said drive means and said brake means for movement between (1) a first position wherein said drive means engages said first spindle to rotatably drive said first spindle, (2) a second position wherein said brake means engages said first spindle to restrain rotation of said first spindle, and (3) a third position wherein said drive means and said brake means are restrained from engaging said first spindle;

f. a second spindle rotatably supported by said frame at a space distance from said first spindle, said second spindle being adapted to receive and rotatably drive a reel for web material, said second spindle being adapted to supply an increased driving torque for driving said reel as an increased force is applied to said second spindle;

g. force applying means supported by said frame for movement between (1) a first condition wherein said force applying means is effective to apply an increased force to said second spindle to substantially increase the driving torque supplied by said second spindle and (2) a second condition wherein said force applying means is restrained from applying said increased force to said second spindle; and h. control means coupling said support means and said force applying means for moving said support means between either its first or second positions when said force applying means is in its second condition and for moving said support means to its third position when said force applying means is moved to its first condition.

5. The mechanism as set forth in claim 4 further comprising:

a. a brake member supported by said frame for movement between (1) a first position wherein said brake member cooperates with said reel received by said second spindle to restrain rotation of said second spindle and (2) a second position wherein said brake member is restrained from braking the rotation of said second spindle; and b. cam means coupling said force applying means and said brake member whereby movement of said force applying means to its first condition is effective to move said brake member to its second position.

6. In a projector, an improvement for selectively controlling movement of a web material along a path which leads between first and second rotatable spindles of the projector, said second spindle including a rotatably-powered driving member and a reel-supporting driven member adapted to receive and rotatably drive the web material as a function of the radial force applied to said driven member of said second spindle, said improvement comprising:

a. driving means engageable with said first spindle for rotatably driving said first spindle;

b. braking means engageable with said second spindle for braking rotation of said first spindle;

c. a plate pivotably mounted to said projector, said plate supporting said driving and braking means for movement between (1) a first position wherein said drive means rotatably drives said first spindle, (2) a second position wherein said brake means restrains said first spindle from being rotatably driven, and (3) a third position wherein said driving and braking means are disengaged from said first spindle;

d. force applying means movable between (1) a first condition wherein it is effective to apply a radial force to said reel-supporting driven member of said second spindle to substantially increase the driving force transmitted by said driven member, and (2) a second condition wherein it is restrained from applying a radial force to said driven member of said second spindle; and e. control means coupled to said plate and to said force applying means for moving said plate between said first and second positions when said force applying means is moved to said second condition and for moving said plate to said third position when said force applying means is moved to said first condition.

7. In a motion picture projector having first and second spindles rotatably supported by a housing, said spindles for receiving and transporting a film strip therebetween, the improvement comprising:

a. a control plate movably supported by said housing;

b. drive means supported by said control plate for movement between (1) a first position wherein said drive means engages said first spindle for driving said first spindle and (2) a second position wherein said drive means is restrained from driving said first spindle;

c. brake means supported by said control plate for movement between (1) a first position wherein said brake means engages said first spindle for braking rotation of said first spindle, and (2) to a second position wherein said braking means is restrained from braking rotation of said first spindle;

d. clutch means operatively coupled to said second spindle, said clutch means comprising a rotatably-powered driving member and a driven member which is frictionally coupled to said driving member, said clutch means being adapted to transmit an increased driving torque to said second spindle as a function of an increased force applied to said driven member;

e. force applying means supported by said housing for movement between (1) a first condition wherein it is effective to apply an increased force to said driven portion of said clutch means and (2) a second condition wherein it is restrained from applying said increased force;

f. a brake member operatively coupled to said force applying means, said brake member movable by said force applying means between (1) a first position wherein said brake member is effective to brake rotation of said second spindle and (2) a second position wherein said brake member is restrained from braking rotation of said second spindle; and g. control means supported by said housing, said control means coupling said control plate and said force applying means for moving said control plate and said force applying means for movement betwen (1) a still position wherein said brake means is in its first position, said force applying means is in its second condition, and said brake member is in its first position, (2) a project position wherein said brake means is in its second position, said force applying means is in its second condition and said brake member is in its second position, (3) a rewind position wherein said brake means is in its second position, said force applying means is in its second condition and said brake member is in its second position, and (4) a fast forward position wherein said brake means is in its second position, said force applying means is in its first condition and said brake member is in its second position.

8. The improvement as set forth in claim 7 wherein said force applying means includes a cam member and wherein said brake lever includes a cam follower adapted to cooperate with said cam member, said cam member and said cam follower operatively coupling said brake lever and said control lever through said force applying means such that movement of said control lever is effective to move said brake lever between its first and second positions.

9. In a motion picture projector, the combination comprising:
   a. a frame;
   b. first and second spindles supported by said frame, said first and second spindles being adapted to receive film reels;
   c. a generally triangular shaped control plate pivotally supported by said frame, said control plate having first, second and third corners;
   d. drive means supported adjacent said first corner of said control plate, said drive means being movable by said control plate between (1) a first position wherein it is in driving contact with said first spindle for rotatably driving said first spindle and (2) a second position wherein said drive means is ineffective to drive said first spindle;
   e. brake means supported adjacent said second corner of said control plate, said brake means being movable between (1) a first position wherein said brake means communicates with said first spindle to brake rotation of said first spindle and (2) a second position wherein said brake means ineffective to brake rotation of said first spindle;
   f. clutch means coupled to said second spindle, said clutch means having a drive portion and a drive portion which is frictionally coupled to said drive portion, said clutch means being suitable to provide an increased driving torque to said second spindle as an increased radial force is applied to said driven portion of said clutch means;
   g. force applying means supported by said frame, said force applying means being movable between (1) a first position for applying a radial force to said driven portion of said clutch and (2) a second position wherein said force applying means is restrained from applying a radial force to said driven portion of said clutch; and
   h. control means coupled to said forced applying means to move said force applying means between its first and second positions and said control means being coupled to said third corner of said control plate for moving said control plate such that said drive means and said brake means are moved between their respective first and second positions.

10. The combination as set forth in claim 9 wherein said force applying means comprises:
    a. a support member movably supported by said frame;
    b. a roller member rotatably supported by said support member, said roller member being adapted to rotatably engage said driven portion of said clutch means for applying a radial force to said driven portion; and
    c. a cam member supported by said support member.

11. The combination as set forth in claim 10 further comprising a brake member supported by said frame for movement between (1) a first position wherein said brake member is effective to engage a received reel on said second spindle for braking rotation of said second spindle, and (2) a second position wherein said brake member is restrained from braking rotation of said second spindle, said brake member being movable to said second position responsive to movement of said cam member.

12. A transport mechanism for web material, said transport mechanism comprising:
    a. a frame;
    b. a pair of spaced-apart spindles rotably supported by said frame, one of said spindles being adapted to support a reel which functions as a supply reel and the other spindle being adapted to support a reel which functions as a take-up reel;
    c. drive means for each of said spindles;
    d. brake means operatively associated with each of said spindles; and
    e. control means operatively coupled to said brake means, said control means being adapted to actuate said brake means in sequence to brake rotation of said spindles, said brake means actuated first in the sequence being self energizable.

* * * * *